Aug. 30, 1966   O. M. YENISEY   3,270,270
REGULATED POWER SUPPLY
Filed June 21, 1962   4 Sheets-Sheet 1

INVENTOR
O. M. YENISEY
ATTORNEY

Aug. 30, 1966     O. M. YENISEY     3,270,270

REGULATED POWER SUPPLY

Filed June 21, 1962     4 Sheets-Sheet 3

INVENTOR
O. M. YENISEY
BY
ATTORNEY

United States Patent Office 3,270,270
Patented August 30, 1966

3,270,270
REGULATED POWER SUPPLY
Osman M. Yenisey, Belleville, N.J., assignor to Bell Telephone Laboratories, Incorporated, New York, N.Y., a corporation of New York
Filed June 21, 1962, Ser. No. 204,263
3 Claims. (Cl. 321—18)

This invention relates to regulated power supply circuits and, more particularly, to circuit improvements that increase the power handling capabilities of regulated power supplies employing controlled power transmission devices, such as transistors or controlled rectifiers, to achieve regulation.

A popular approach to regulating the direct-current output of a power supply to which unregulated alternating current is applied is to use controlled rectifiers both as the rectifying elements of the power supply and as transmission switches to control the quantity of power converted. The unidirectional conduction characteristic of a controlled rectifier is determined by the voltage applied to its control element. Conventionally, regulation of the direct-current output of the power supply is effectuated by operating upon the control elements of the controlled rectifiers permitting them to conduct only during limited portions of the cycle of the alternating-current signal from which the direct-current power is developed. If, at a particular instant for example, little power is to be provided at the power supply output, the controlled rectifiers are made to conduct only during a small increment or angle of each alternating-current cycle, and as larger amounts of power are called for, the controlled rectifiers operate at larger conduction angles. A control loop connected from the direct-current output to the control elements of the controlled rectifiers is the generally accepted scheme for governing the conduction angles of the controlled rectifiers.

In the past, various devices have been developed to function as controlled rectifiers. Ignitrons, cold-cathode gas tubes, thyratrons and pnpn triode transistors are a few devices representative of this category. These devices typically experience a common pattern of improvement from the time of discovery which is stimulated by the demands of industry for devices meeting ever new and advanced specifications. Initially a device will have a low power handling capability or rating, thereby greatly hampering full utilization of the attractive properties of the device in commercial applications. Furthermore, even when devices having high power rating are later developed and made available they often prove more expensive than lower rated devices, so it is usually desirable to employ a device having the lowest possible power rating that the application at hand will permit. Most conventional controlled rectifier power supplies, however, fail to meet the desideratum. They tend to be patterned after old power supply designs, merely substituting controlled rectifiers for standard rectifiers with the result that all the power converted from alternating-current power to direct-current power by the power supply passes through the controlled rectifiers and the power capacity of the power supply is limited to that of the controlled rectifier.

One solution to the restraint imposed by the power ratings of controlled rectifiers is to connect plural controlled rectifiers in parallel to distribute the power among the parallel-connected devices. This approach, however, is not particularly satisfactory for commercial applications. In order to insure an equal distribution of power among the controlled rectifiers, the transmission characteristics of the various parallel paths must be matched, a tedious and expensive operation. If any mismatch does occur, a regenerative condition caused by resistive heating in the devices may develop, causing one or several of the controlled rectifiers to carry all the power and the remaining controlled rectifiers to carry virtually none of the power.

V. J. Terry et al, Patent 2,642,558, issued June 16, 1953, discloses a controlled rectifier power supply designed to overcome the power limitation imposed by the use of available controlled rectifiers. The principle there employed is that only a portion of the converted direct-current power passes through the controlled rectifier, thus permitting use of controlled rectifiers having low power ratings with power supplies yielding high power outputs. The Terry et al power supply implements this principle with two circuits, one of which develops an uncontrolled direct-current component from standard rectifiers and the second of which develops a regulated or controlled direct-current component from controlled rectifiers. The two direct-current components are added across the power supply output, the resultant providing a regulated source of direct-current power.

A shortcoming of the above power supply is that the total required power capacity of the transformers employed is of necessity larger than the power capacity of the power supply. This transformer requirement accounts for increases in size, weight, and cost of the Terry et al. power supply as compared with conventional power supplies in which the transformer power capacity equals the power supply capacity.

Another disadvantage in the Terry et al. power supply is that the range over which the resultant direct-current output power can be varied is limited. The maximum power obtainable is that of the unregulated component plus the regulated component available when the controlled rectifiers are operated at the maximum conduction angle. The minimum power which the power supply can yield is that of the unregulated power component "per se." Thus, the regulation possible is restricted in range according to the power carried by the controlled rectifiers.

It is, therefore, the object of the present invention to reduce transformer power capacity requirements and expand the range of available output power of a regulated power supply of the type whose direct-current power output is derived from controlled power component superimposed upon an uncontrolled power component.

In accordance with the above object, two sources of alternating-current power are connected together so that they combine and the combined alternating-current power is applied to a common rectifier circuit that delivers converted direct-current power to an output circuit. One of the alternating-current sources provides relatively constant unregulated power. The other provides intermittent or variable power controlled by a controllable power transmission device that may, but need not, be a controlled rectifier circuit. Other types of controllable transmission devices such as transistors or relays could be used because the function of rectification of the controlled power is performed by the common rectifier. Combination of alternating-current power components is accomplished by serially connecting the secondary windings of a pair of transformers whose primary windings are each coupled to a respective one of the alternating-current sources. The power transmission device resides in the primary circuit of the regulated source transformer and conducts during intervals of the cycle of the alternating-current input as needed to achieve regulation of the direct-current output of the power supply. By virtue of this arrangement, the total power capacity of the two transformers need be no larger than the maximum direct-current output power.

If the controlled transmission device functions as a switch, placement of it in the primary circuit, as described, allows the regulated source transformer to reduce the effect on the direct-current output of switching transients produced during switching operations. In addition, full utilization of both the current and voltage ratings of the transmission device is possible, regardless of the current and voltage requirements of the direct-current output, through selection of the proper turns ratio of the transformer.

It is a particular feature of the invention that the regulated source transformer may have two primary circuits rendered operable on an alternative basis by individual power transmission devices. One of the primary windings is adapted to transfer power to the secondary winding which is in phase with the power transferred to the secondary winding of the regulated source transformer. In this case, regulated power is added to unregulated power. The other regulated source primary winding is adapted to transfer power to the secondary winding which is 180 degrees out of phase with the power transferred to the secondary winding of the regulated transformer. Regulated power is thereby subtracted from unregulated power. Thus, by combining regulated power with unregulated power in either additive or subtractive fashion a greater portion of the converted direct-current power is contributed by the unregulated alternating-current source and a correspondingly smaller portion of power is transferred through each transmission switch for the same range of direct-current output power than would be the case if only an additive combination is practiced. Stated conversely, by permitting both addition to or subtraction from the unregulated power of the regulated power a greater range of available output power is possible for the same quantity of power transfer through each transmission device.

These and other features of the invention will be discussed in detail in the following specification taken in conjunction with the drawings in which:

FIG. 1 is a schematic diagram of a power supply circuit illustrating several features of the invention;

FIGS. 2A, 2B, and 2C are schematic diagrams of exemplary configurations of circuits functioning as controllable transmission devices;

Figure 1:
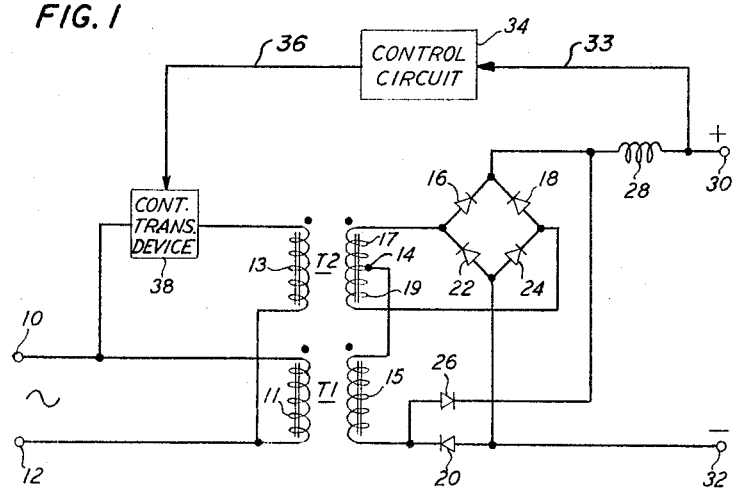

In FIG. 1 alternating-current power is provided across input terminals 10 and 12 of a power supply. This alternating-current power is distributed to primary windings 11 and 13 of transformers T-1 and T-2, respectively, connected in parallel between input terminals 10 and 12. A controllable transmission device 38, connected in series with primary winding 13 between input terminals 10 and 12, regulates the flow of power through transformer T-2. Controlled rectifiers, having two discrete stable states of bilateral conduction (high and low) and arranged to conduct bilaterally, are desirable for most applications because they have larger power handling capabilities than many other suitable devices. But controllable transmission device 38 need only perform the function of alternating-current power transmission (not rectification) and thus could be a simple relay, an arrangement of transistor switches or even a controlled resistance that is variable over a continuous range of values, e.g., a potentiometer driven by a servo or a single transistor operating bilaterally. In the following discussion, however, controllable transmission device 38 will be considered to be operating as a switch having two stable states of conduction. When controllable transmission device 38 is in a low conduction state, the primary circuit of transformer T-2 is effectively open circuited, thus inhibiting power flow through transformer T-2. When controllable transmission device 38 is in a state of high conduction, on the other hand, the primary circuit is closed circuited and power passes across transformer T-2.

Alternating-current power is continuously transferred from primary winding 11 to a secondary winding 15 of transformer T-1. The polarity dots shown on the windings of transformer T-1 indicate that a positive voltage at input terminal 10 induces a positive voltage on the terminal of secondary winding 15 closest to the dot. In this case, during intervals in which controllable transmission device 38 is not conducting, current flows from the polarity dot on secondary winding 15 toward the secondary winding of transformer T-2 which is composed of sections 17 and 19 joined at an intermediate tap 14. A lead connects one terminal of secondary winding 15 to tap 14. Current flowing from secondary winding 15 divides at tap 14. Part of this current passes through section 17 and a diode 16, poled for conduction from the end terminal of section 17 to a direct-current output terminal 30. The remainder passes from tap 14 to terminal 30 via section 19 and a diode 18, poled for conduction from the end terminal of section 19 to output terminal 30. A filter inductor 28 is connected in series between the junction of diodes 16 and 18 and terminal 30 to smooth the ripple of the rectified power. Current flowing from diodes 16 and 18 through inductor 28 to terminal 30 is returned, after passage through a load (not shown), to an output terminal 32. The current is then returned to secondary winding 15 through a diode 20 which is poled for conduction from terminal 32 to the other terminal of secondary winding 15. A diode 26 is poled for conduction from the same terminal of secondary winding 15 to output terminal 30. During that portion of the mode of operation just described, diode 26 is back-biased because the voltage appearing across secondary winding 15 is impressed across it in the reverse direction.

When the terminal of secondary winding 15 farther from the polarity dot assumes a positive voltage, conduction of current to terminal 30 occurs through diode 26 and return of current from terminal 32 occurs through diodes 22 and 24, the former of which is poled for conduction from terminal 32 to the end terminal of section 17 and the latter of which is poled for conduction from terminal 32 to the end terminal of section 19. Current then passes through sections 17 and 19 and recombines at tap 14 for return to secondary winding 15. During this portion of the mode of operation of the power supply diode 20 is back-biased, due to the impression across it in the reverse direction of the voltage appearing across secondary winding 15.

The purpose of section 19 and diodes 18 and 24 is to provide a flux that opposes the flux arising in section 17 during intervals in which controllable transmission device 38 is nonconducting. As a result, the net flux linkages in the secondary winding of transformer T-2 are zero, obviating the possibility of damage to the components, e.g., controlled rectifiers, of controllable transmission device 38 due to excessive reverse bias that could occur from power transfer to primary winding 13 from section 17. During intervals of conduction of controllable transmission device 38, section 19 and diodes 18 and 24 perform no functions, unless the voltage appearing across section 19 exceeds the voltage appearing across winding 15.

The voltage and/or current conditions across terminals 30 and 32 are sensed and communicated by a symbolically-shown connection 33 to a control circuit 34 which develops a signal applied by another symbolically-shown connection 36 to control the characteristics of controllable transmission device 38 responsive to the conditions across output terminals 30 and 32. It is well understood that the circuit representations of connections 33 and 36 would require second leads to provide return paths for current. Elaboration of the details of their location, however, is not necessary to comprehend the invention. When an increase in power transfer from input terminals 10 and 12 to output terminals 30 and 32 is indicated by the conditions existing across output terminals 30 and 32 to be in order, control circuit 34 imposes a larger conduction angle on controllable transmission device 38. Conversely, when less power is called for across output terminals 30 and 32, controllable transmission device 38 is made to operate at a smaller conduction angle. During portions of the cycle of the alternating-current power in which controllable transmission device 38 is conducting, the voltage induced in section 17 adds to the voltage appearing across secondary winding 15. At the same time, the voltage induced in section 19 subtracts from the voltage appearing across secondary winding 15. Thus, during the half cycle diode 16 conducts, diode 18 is back-biased, while on the half cycle diode 22 conducts, diode 24 is back-biased. As a result, the sum of the voltages across section 17 and secondary winding 15 is impressed upon the alternating-current side of the rectifier bridge consisting of diodes 16, 20, 22, and 26, while the circuit consisting of section 19, diode 18, and diode 24 is dormant.

In summary, alternating-current power supplied continually by secondary winding 15 adds to alternating-current power supplied intermittently by section 17 to produce regulated direct-current power across output terminals 30 and 32. The total quantity of direct-current power at output terminals 30 and 32 is controlled by the duration of the increment of each alternating-current cycle in which controllable transmission device 38 conducts. The range of output power is capable of variation between a minimum produced when controllable transmission device 38 is operative during no part of an alternating-current cycle, in which case power available at output terminals 30 and 32 is that power transferred across transformer T-1 alone, to a maximum produced when controllable transmission device 38 is operative during an entire alternating-current cycle. The range of direct-current power is readily adjustable by changing the relative impedance characteristics of transformers T-1 and T-2. For example, if the range is to be increased, either the impedance of transformer T-2 is decreased or that of transformer T-1 increased. Isolation of the switching device from output terminals 30 and 32 is provided by transformer T-2, so the effect of transients on the converted power is small. Another advantage in the location of controllable transmission device 38 in the primary circuit of transformer T-2 when controlled rectifiers are used is that regardless what the specifications are for direct-current output current and voltage, the proper balance of current and voltage to fully utilize both the maximum current rating and reverse voltage rating of the controlled rectifier can be obtained simply by proper selection of the turns ratio of transformer T-2.

Figure 4:
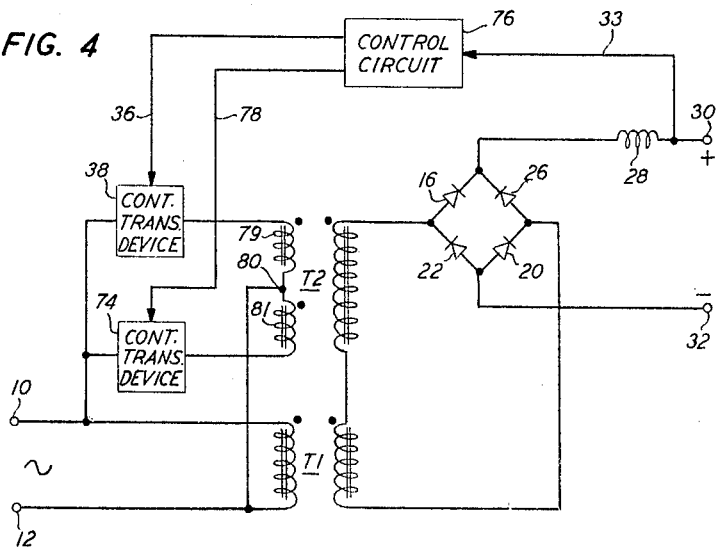
FIG. 4 is a schematic diagram of a power supply circuit illustrating several additional features of the invention.

The nature of control circuit 34 depends in large measure on the type of components employed in controllable transmission device 38. If, for example, a thyratron tube were to be employed, control circuit 34 might produce a bias voltage which is continuously applied to the grid of the thyratron, as described in the above Terry et al. patent, to determine the quantity of regulated power applied to ouput terminals 30 and 32. If, on the other hand, in accordance with more modern techniques a pnpn triode transistor is to be employed as a controlled rectifier, control circuit 34 would be a so-called "firing control circuit" consisting of a pulse source synchronized to the alternating-current signal. A half wave magnetic firing control circuit is shown in FIG. 4.9 on page 42 of the General Electric Silicon Controlled Rectifier Manual, General Electric Company, second edition, 1961. Two such devices can be used to produce a full wave firing control circuit as called for in the present application.

Figure 6A:
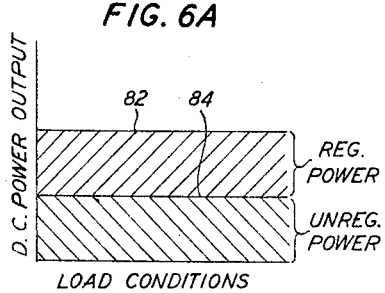
FIGS. 6A and 6B are graphs helpful in illustrating the advantages of the invention.

FIG. 6A is a graph showing typical specifications of direct-current power output that the power supply described in FIG. 1 might be called upon to satisfy. Line 82 represents the maximum limit of output power which is required of the power supply and line 84 represents the minimum power output required. To achieve these specifications, the circuit of FIG. 1 provides a continuous unregulated component of direct-current power represented by the area on the graph between the base line of the graph and line 84 and an intermittent regulated component of direct-current power represented by the area on the graph between lines 84 and 82. The range of direct-current output power is shown to be equal to the power passing through controllable transmission device 38, i.e., the regulated power. This graph and its application to the power supply of FIG. 1 should be kept in mind for comparison hereafter with a similar graph, shown in FIG. 6B, delineating the characteristics of a more improved power supply circuit.

Figure 2A:
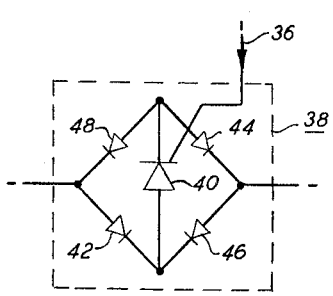
Figure 2B:
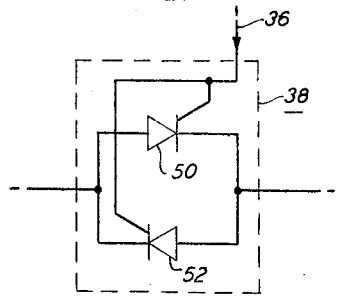
Figure 2C:
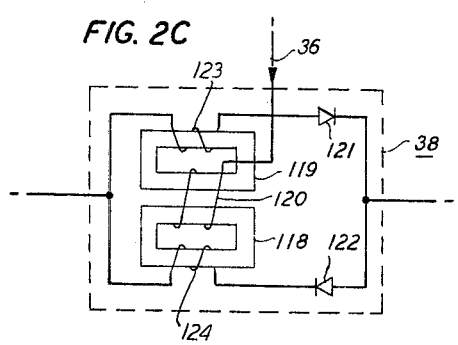

In FIGS. 2A, 2B, and 2C exemplary arrangements of circuits which will function as controllable transmission device 38 are illustrated. In FIG. 2A a single controlled rectifier 40 is arranged to carry current of either polarity. Current flowing from left to right in FIG. 2A travels through a diode 42 to the anode of controlled rectifier 40 and passes from the cathode of controlled rectifier 40 to the other lead through a diode 44. Current flowing from right to left is applied to the anode of controlled rectifier 40 through diode 46 and passes to the other lead from the cathode of controlled rectifier 40 via diode 48. In FIG. 2B paired controlled rectifiers 50 and 52 are poled oppositely and in parallel. This likewise provides bilateral high conduction paths. FIG. 2C shows a magnetic switch having two legs, one including a coil 123 on a saturable core 119 and a diode 121 and the other including a coil 124 on a saturable core 118 and a diode 122. Until the cores saturate essentially no current is passed through the switch. After saturation is reached diode 121 permits current flow in the upper leg only from left to right and diode 122 permits current flow in the lower leg only from right to left. The current applied to a control winding 120 wrapped around both cores 118 and 119 varies the point of each cycle at which saturation occurs.

Figure 3:
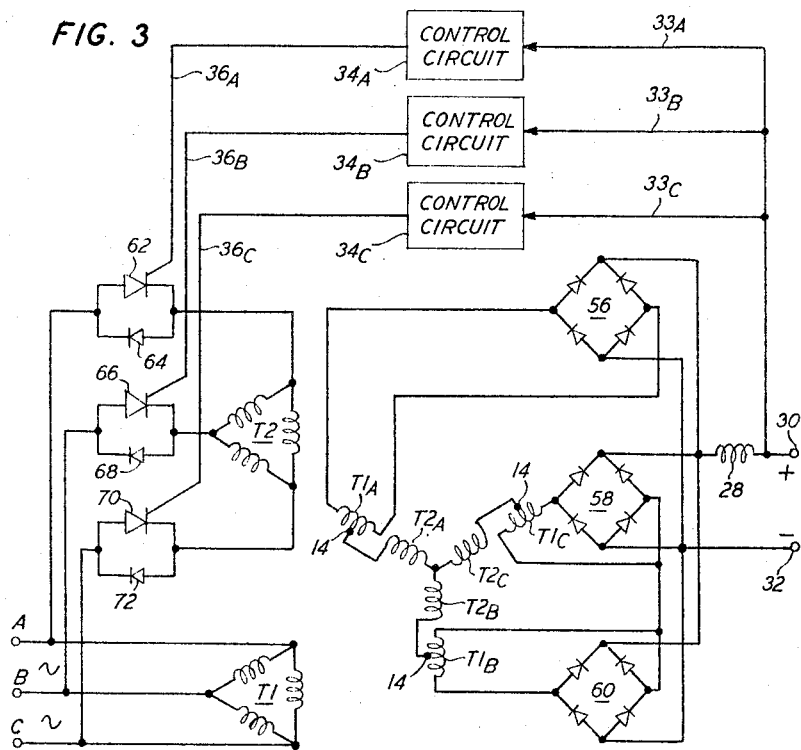
FIG. 3 is a schematic diagram of a three-phase adaptation of the circuit shown in FIG. 1.

FIG. 3 depicts a three-phase adaptation of the circuit shown in FIG. 1. Where possible, the components of FIG. 3 have like designations as their counterparts in FIG. 1. Input terminals A, B, and C, carrying three-phase power, have connected to them Δ-connected primary windings of a transformer T-1. Also connected to input terminals A, B, and C are the Δ-connected primary windings of transformer T-2. As in FIG. 1, a conducting path between the alternating-current power and the primary windings of transformer T-2 is only intermittently completed in order to control the direct-current ouput power produced. Y-connected secondary windings for both transformers T-1 and T-2 are provided, each phase secondary winding of transformer T-1 being connected to its corresponding phase winding of transformer T-2. The alternating-current sides of bridges 56, 58, and 60, each corresponding to and performing as the bridge formed in FIG. 1 by diodes 16, 20, 22, and 26, are connected across the end terminals of the secondary windings of transformer T-1 and the direct-current output sides of bridge rectifiers 56, 58, and 60 are connected across output terminals 30 and 32.

When each of controlled rectifiers 62, 66, and 70 in the primary circuit of transformer T-2 conduct, regulated power is transferred across transformer T-2. Controlled rectifiers 62, 66, and 70 are controlled by firing control circuits $34_A$, $34_B$, and $34_C$, respectively. Current flows from terminals A, B, and C through control rectifiers 62, 66, and 70 to the primary windings of transformer T-2 and back to terminals A, B, and C through diodes 64, 68, and 72. In addition to providing return paths for current, diodes 64, 68, and 72 serve as protection against excessive reverse voltages imposed upon their associated controlled rectifiers. As described in connection with FIG. 1, the power transferred by transformer T-2 combines additively with the power transferred by transformer T-1 to produce a regulated direct-current output.

A power supply is disclosed in FIG. 4 which alternatively adds or subtracts regulated power to or from unregulated power. The components of FIG. 4 are labeled identically with their counterparts in FIG. 1. Continuous power, transferred across transformer T-1 from alternating-current terminals 10 and 12, is supplied to the alternating-current side of a bridge rectifier comprising diodes 16, 20, 22, and 26, through the secondary winding of transformer T-2. In this embodiment, as distinguished from the one of FIG. 1, the net flux linkages in the secondary winding of transformer T-2 during periods of nonconduction of the controlled rectifiers are not zero. In order to avoid damage to the controlled rectifiers, an airgap in the core of transformer T-2 might be found advisable. The primary winding of transformer T-2 is composed of sections 79 and 81 and a center tap 80. The end terminal of section 79 is connected to terminal 10 through controllable transmission device 38 and center tap 80 is connected directly to terminal 12. When operative, the primary circuit including controllable transmission device 38 transfers power to the secondary winding of transformer T-2 which, as indicated by the polarity dots, additively combines with the power transferred to the secondary winding of transformer T-1. Also connected to input terminal 10 is the end terminal of section 81 via a controlled rectifier 74. When the primary circuit including section 81 becomes operative, power is transferred to the secondary winding of transformer T-2 which, as indicated by the polarity dots, combines subtractively with the power transferred across transformer T-1. Output terminal 30 is connected to a control circuit 76 by connection 33. Control circuit 76 (considered in detail below) senses when it is necessary to add regulated power to unregulated power or subtract regulated power from unregulated power and actuates the appropriate controllable transmission device (either 38 or 74) into conduction for an interval sufficient to provide the required level of output power.

Figure 6B:
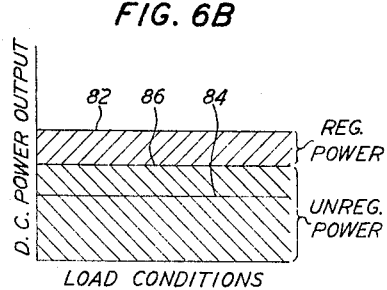

FIG. 6B illustrates the direct-current output specifications called for in FIG. 6A as a basis for comparison of the power supplies of FIGS. 1 and 4. A maximum power requirement is again represented by line 82 and a minimum power requirement represented by line 84. In order to meet the specified range of regulation, the unregulated power may be set at a higher level, shown as line 86 lying midway between lines 82 and 84, and the regulated power passing through either controlled rectifier circuit made smaller (the power represented between lines 86 and 84 or 86 and 82). Conversely, with controllable transmission devices having the same current and reverse voltage ratings a larger range of power output is possible with the power supply of FIG. 4 than with the power supply of FIG. 1.

Figure 5:
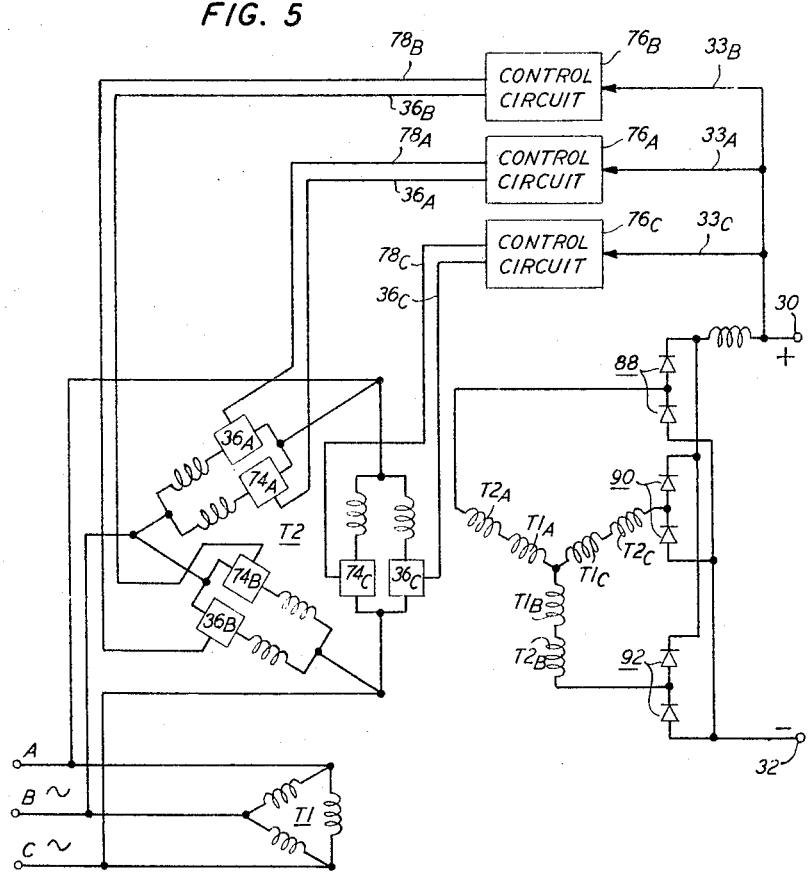
FIG. 5 is a schematic diagram of a three-phase equivalent to the circuit depicted in FIG. 4.

In FIG. 5 a three-phase equivalent of the circuit of FIG. 4 is shown. Components of FIG. 5 have like designations as their counterparts in FIGS. 4 and 3. Three-phase power from input terminals A, B, and C is applied in parallel to Δ-connected primary windings of transformers T-1 and T-2. Each primary branch of transformer T-2 is composed of a winding serially connected to a controllable transmission device in parallel with an alternatively operative and oppositely wound winding serially connected to a controllable transmission device. As in the case of FIG. 4, controllable transmission devices $36_A$, $36_B$, and $36_C$ conduct causing power flow through their respective windings to the secondary circuit of transformer T-2 when large power output is required and controllable transmission devices $74_A$, $74_B$, and $74_C$ conduct causing power flow through their respective windings when small power output is called for.

The secondary circuit is Y-connected. Each branch comprises in series secondary windings of one phase of each of transformers T-1 and T-2. Half bridge rectifiers 88, 90, and 92 finally convert the alternating-current power appearing in the secondary circuit to direct-current power for application to output terminals 30 and 32.

Figure 7A:
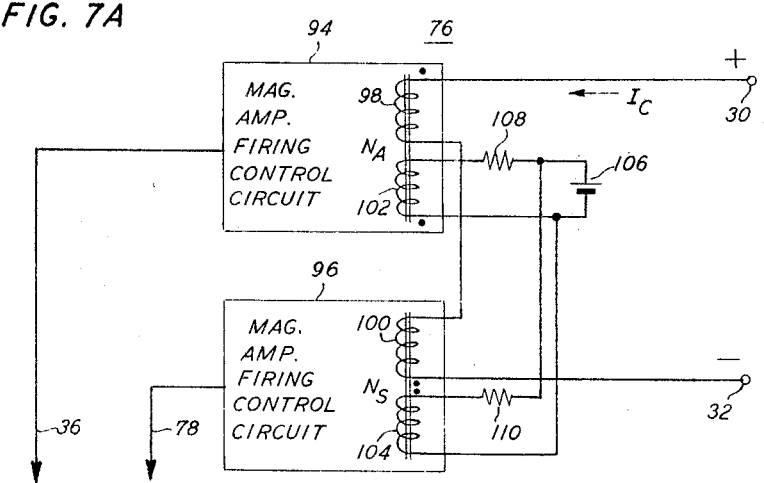
FIG. 7A is a partial schematic diagram of the control circuit shown in block form in FIGS. 4 and 5.
Figure 7B:
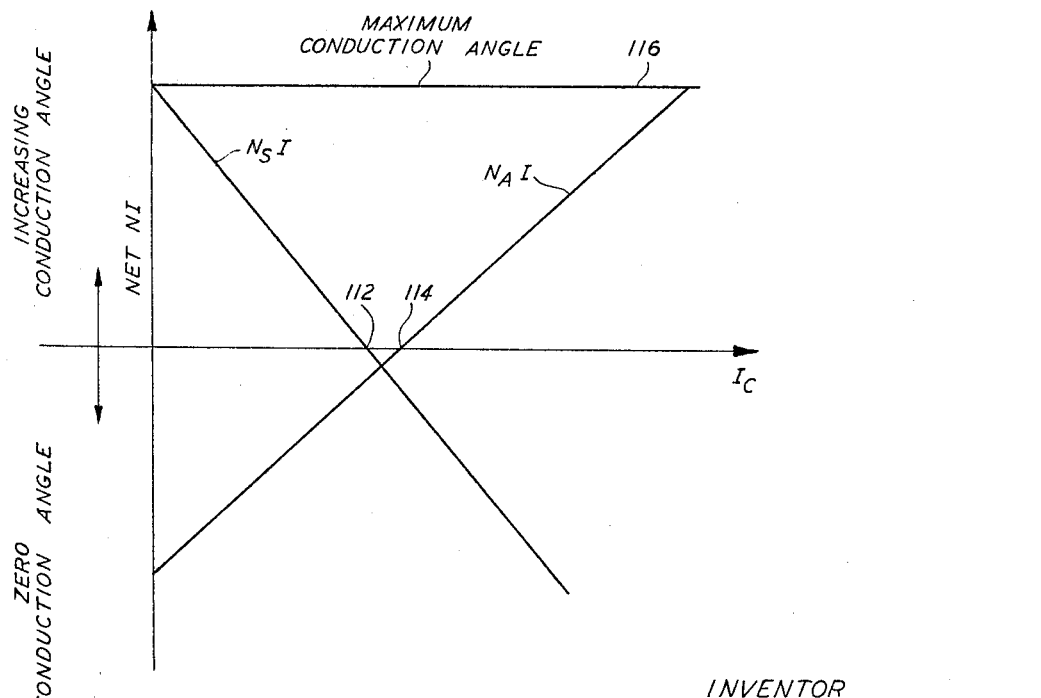
FIG. 7B is a graph showing the characteristics of the control circuit disclosed in FIG. 7A.

FIG. 7A discloses an arrangement which will perform the function of control circuit 76 (utilized in FIG. 4) and FIG. 7B illustrates the characteristics of this circuit. Magnetic amplifier firing control circuits 94 and 96 are common, commercially available magnetic amplifier circuits, for example, the above-cited circuit from the General Electric Silicon Controlled Rectifier Manual. They each produce a signal for governing the conduction angle of controlled rectifiers responsive to the flux linkages in a core element produced by a control signal applied to a control winding wrapped around the core element. Control winding 98 of magnetic amplifier 94 and control winding 100 of magnetic amplifier 96 are connected in series across output terminals 30 and 32 of the power supply of FIG. 4. Winding 98 is wound on its core to increase the conduction angle of the controlled rectifier it governs as direct current increases and winding 100 is wound on its core to produce the opposite effect with respect to the conduction angle of the controlled rectifier it governs. A bias is imposed upon each of the cores. Bias windings 102 and 104 are wound on the cores of magnetic amplifiers 94 and 96, respectively, to produce fluxes opposing those produced by windings 98 and 100, respectively. A bias source 106 and current limiting resistors 108 and 110 complete the bias circuit.

FIG. 7B is a plot of control current, represented by $I_C$, versus the net flux linkages in the cores of the magnetic amplifiers. The area below the base line (abscissa) represents a region in which the conduction angle is zero. Above the base line the conduction angle enlarges along the ordinate moving away from the origin to a line 116, representing the point of maximum conduction.

As the control current, represented by $I_C$, increases from its minimum value, represented by line 84 in FIG. 6B, the net flux linkages in the core of magnetic amplifier 96, represented by $N_SI$, decrease thus reducing the conduction angle of the associated controlled rectifier. This continues until the base line of the graph is reached (point 112) at and after which point the conduction angle produced by magnetic amplifier 96 is zero. At the same time, the net flux linkages in the core of magnetic amplifier 94, represented by $N_AI$, increase. Above the base line (point 114) the conduction angle begins increasing, and increases to a maximum conduction angle at line 116. The width of the safety region between points 112 and 114, where no controlled power is delivered to the outut terminals, is determined by the relative values of resistors 108 and 110.

What is claimed is:

1. A power supply comprising a first transformer having a first and second primary winding and a secondary winding, said first and second primary windings being adapted to induce voltages of opposite polarities in said secondary winding, a second transformer having a primary and secondary winding, a pair of controlled circuits having high and low states of conduction, rectifying means having a first and second pair of terminals, a source of alternating-current power, a load, means for serially connecting said alternating-current source, one of said controlled circuits and said first primary winding, means for serially connecting said alternating-current source, the other of said controlled circuits and said second primary winding of said first transformer, means for connecting the primary winding of said second transformer to said alternating-current source, means for serially connecting the secondary winding of said first transformer, the secondary winding of said second transformer and the first pair of terminals of said rectifying means, means for connecting said load to the second pair of terminals of said rectifying means, and means for alternatively actuating said controlled circuits into a high state of conduction responsive to the conditions at said second pair of terminals.

2. A three-phase power supply comprising a first transformer having first and second primary windings connected in parallel, each having three sections and a secondary winding having three sections, said first and second primary windings being adapted to induce voltages of opposite polarities in said secondary winding, a second transformer having primary and secondary windings each having three sections, corresponding sections of said secondary windings of said first and second transformers being connected in series, a controlled transmission circuit connected in series with each of said sections of said first and second primary windings of said first transformer, a source of three-phase alternating-current power, means for coupling said source to the primary windings of said first and second transformers, a pair of output terminals, and three half bridge rectifiers connecting said secondary windings of said first and second transformers to said output terminals.

3. In a power supply, a first transformer having a first and second primary winding and a secondary winding, said first and second primary windings being arranged to induce voltages of opposite polarities in said secondary winding, a second transformer having a primary and secondary winding, a pair of bistable transmission devices having high and low states of conduction, a source of alternating current, means for coupling said source to the primary winding of said second transformer, means for connecting one of said bistable devices and said first primary winding in series across said alternating-current source, means for connecting the other of said bistable devices and said second primary winding in series across said alternating-current source, means for connecting the secondary winding of said first transformer and the secondary winding of said second transformer in series, means for rectifying the voltage induced in said series-connected secondary windings, and means for alternatively actuating said bistable devices into a high state of conduction during intervals of the cycle of the alternating current comprising a control circuit individual to each of said bistable devices for controlling the state of conduction thereof, the portion of each cycle during which said control circuits render said bistable devices conductive depending upon the magnitude of magnetic flux of a given direction developed in said control circuits, means for developing a biasing flux in one of said control circuits in said given direction and in the other of said control circuits in a direction opposite to said given direction, and means for developing a flux in each of said control circuits dependent in magnitude upon the output current and opposite in direction to the bias flux applied thereto.

References Cited by the Examiner

UNITED STATES PATENTS

| | | | |
|---|---|---|---|
| 2,349,685 | 5/1944 | Trucksess | 321—20 X |
| 2,579,235 | 12/1951 | Kerns | 321—18 |
| 2,728,887 | 12/1955 | Rockafellow | 321—16 X |
| 2,834,931 | 5/1958 | Walker | 321—20 |
| 2,992,379 | 7/1961 | Rosin | 321—20 X |
| 3,113,259 | 12/1963 | Walker | 321—24 |

JOHN F. COUCH, *Primary Examiner*.

LLOYD McCOLLUM, *Examiner*.

G. H. GERSTMAN, W. E. RAY, *Assistant Examiners*.